(12) United States Patent
Cho (10) Patent No.: US 11,978,362 B2
(45) Date of Patent: May 7, 2024

(54) TRANSPARENT DISPLAY DEVICE USING ROTATION-BASED PERSISTENCE OF VISION AND GAME MACHINE EQUIPPED WITH THE SAME

(71) Applicant: TOVIS CO., LTD., Incheon (KR)

(72) Inventor: Seung Bum Cho, Seoul (KR)

(73) Assignee: TOVIS CO., LTD., Incheon (KR)

( * ) Notice: Subject to any disclaimer, the term of this patent is extended or adjusted under 35 U.S.C. 154(b) by 304 days.

(21) Appl. No.: 17/632,246

(22) PCT Filed: Jul. 17, 2020

(86) PCT No.: PCT/KR2020/009452
§ 371 (c)(1),
(2) Date: Feb. 2, 2022

(87) PCT Pub. No.: WO2021/025325
PCT Pub. Date: Feb. 11, 2021

(65) Prior Publication Data
US 2022/0277671 A1 Sep. 1, 2022

(30) Foreign Application Priority Data
Aug. 2, 2019 (KR) .................. 10-2019-0094362

(51) Int. Cl.
*G09F 11/23* (2006.01)
*A63F 13/25* (2014.01)
*G09F 11/02* (2006.01)

(52) U.S. Cl.
CPC .............. *G09F 11/23* (2013.01); *A63F 13/25* (2014.09); *G09F 11/02* (2013.01)

(58) Field of Classification Search
CPC ........... G09F 11/23; G09F 11/02; A63F 13/25
See application file for complete search history.

(56) References Cited

U.S. PATENT DOCUMENTS

| 4,021,953 A | * | 5/1977 | Couch | ..................... G09F 11/02 40/506 |
| 4,067,128 A | * | 1/1978 | Kempster | ............... G09F 11/23 40/500 |

(Continued)

FOREIGN PATENT DOCUMENTS

| KR | 20-0315290 Y1 | 6/2003 |
| KR | 20-0355482 Y1 | 7/2004 |

(Continued)

OTHER PUBLICATIONS

International Search Report for PCT/KR2020/009452 dated Sep. 25, 2020 from Korean Intellectual Property Office.

*Primary Examiner* — Gary C Hoge
(74) *Attorney, Agent, or Firm* — Revolution IP, PLLC (57) ABSTRACT

A transparent display device using rotation-based persistence of vision includes: an opaque display unit that displays first images; a transparent display unit that includes image display bars, which are positioned outside the opaque display unit and on each of which a plurality of light emitting elements are mounted, and a display bar driving unit which rotates the image display bars, the transparent display unit displaying second images which are viewed to overlap the first images by persistence of vision based on rotation of the image display bars; and a display casing that accommodates both the opaque and transparent display units in a state where the transparent display unit is positioned outside the opaque display unit, the display casing having a sight window through which the first images and the second images are viewed at a preset region.

16 Claims, 7 Drawing Sheets

(56) References Cited

U.S. PATENT DOCUMENTS

| | | | |
|---|---|---|---|
| 10,102,781 B1* | 10/2018 | Mitchell | A47G 33/00 |
| 2010/0033945 A1* | 2/2010 | Huang | G09F 21/045 |
| | | | 362/35 |
| 2010/0048285 A1* | 2/2010 | Graf | G07F 17/3211 |
| | | | 463/20 |
| 2011/0085109 A1 | 4/2011 | Kim | |
| 2019/0331998 A1* | 10/2019 | Kim | G09F 19/14 |
| 2022/0343812 A1* | 10/2022 | Woo | G09F 9/33 |
| 2022/0415219 A1* | 12/2022 | Lee | G09G 3/32 |

FOREIGN PATENT DOCUMENTS

| | | |
|---|---|---|
| KR | 10-0868942 B1 | 11/2008 |
| KR | 10-2009-0127547 A | 12/2009 |
| KR | 10-2011-0108463 A | 10/2011 |
| KR | 10-1543418 B1 | 8/2015 |

\* cited by examiner

TRANSPARENT DISPLAY DEVICE USING ROTATION-BASED PERSISTENCE OF VISION AND GAME MACHINE EQUIPPED WITH THE SAME

TECHNICAL FIELD

The present invention relates to a display device that displays an image.

BACKGROUND ART

In general, a display device is a device for displaying an image, and display devices having various shapes have been recently developed to improve a visual effect of an image displayed on the display devices.

An example of the display devices is a "cylinder rotation display device using the persistence of vision" disclosed in Korean Unexamined Patent Publication No. 10-2011-0108463 (published on Oct. 6, 2011).

The cylinder rotation display device in the related art is configured to display a video using the persistence of vision by causing a drive module to rotate a plurality of light emitting diodes arranged in a row.

However, the cylinder rotation display device in the related art includes the light emitting diodes installed biasedly in one direction with respect to a rotating shaft, thus having eccentricity during rotation and having a problem in that a clear image is difficult to display since the light emitting diodes oscillate due to generation of the eccentricity.

In addition, an image board that provides an image signal to display an image is separated from the light emitting diodes, and thus problems arise in that a complicated access structure for transmitting the image signal is configured, it is likely to result in malfunction, and a high-definition image is difficult to display due to difficulty in transmitting a high-definition image signal.

In addition, since the cylinder rotation display device in the related art simply displays only an image formed using persistence of vision, a problem of low visual effect arises.

SUMMARY OF INVENTION

Technical Problem

The present invention is made to solve the above-described problems, and objects of the present invention are to provide a transparent display device using rotation-based persistence of vision and a game machine equipped with the transparent display device that can display a uniform-definition image by minimizing generation of eccentricity, can have a simple structure so as to be easily manufactured and reduced in size, and can improve a visual effect by displaying other images in addition to an image displayed using the persistence of vision.

In addition, other objects of the present invention are to provide a transparent display device using rotation-based persistence of vision and a game machine equipped with the transparent display device that does not have an access structure for transmitting an image signal to a rotating body such that manufacturing costs can be reduced, the occurrence of malfunction is minimized, and a high-definition image can be displayed by easily transmitting a high-definition image signal.

Solution to Problem

According to an embodiment of the present invention to achieve the above-described object, there is provided a transparent display device using rotation-based persistence of vision, the transparent display device including: an opaque display unit that displays first images; a transparent display unit that includes image display bars, which are positioned outside the opaque display unit and on each of which a plurality of light emitting elements are mounted, and a display bar driving unit which rotates the image display bars, the transparent display unit displaying second images which are viewed to overlap the first images by persistence of vision based on rotation of the image display bars; a display casing that accommodates both the opaque and transparent display units in a state where the transparent display unit is positioned outside the opaque display unit, the display casing having a sight window through which the first images and the second images are viewed at a preset region.

The transparent display unit includes a plurality of image display bars which are arranged around a display bar rotating shaft at regular angles such that eccentricity is inhibited from being generated during rotation of the image display bars.

The transparent display unit may include display bar connecting members which connect the plurality of image display bars to be all separated from the display bar rotating shaft in order to form a predetermined mounting space in which the opaque display unit is mounted as the image display bars rotate, and image boards which are provided at the respective display bar connecting members to rotate together with the image display bars and provide image signals of the first images which are to be displayed on the image display bar.

The display bar connecting members may have respective board mounting portions which project from the display bar connecting members and at which the respective image boards are mounted. Each of the display bar connecting member may have a dummy portion at a portion at which the board mounting portion is not formed, the dummy portion projecting to have a shape corresponding to the board mounting portion in order to inhibit eccentricity from being generated during rotation.

The opaque display unit may include a display panel which electronically displays the second images.

The opaque display unit may include a rotary wheel which has a plurality of the second images formed into a pattern in a circumferential direction, and a wheel driving unit which drives the rotary wheel.

A wheel rotating shaft of the rotary wheel and the display bar rotating shaft of the image display bar may be positioned on the same axial line.

The display bar rotating shaft may be formed into a penetrating shape such that the wheel rotating shaft of the rotary wheel is inserted and fitted into the display bar rotating shaft. The transparent display device using rotation-based persistence of vision may further include an inner bearing that is provided between the wheel rotating shaft and the display bar rotating shaft in a state where the wheel rotating shaft is inserted into the display bar rotating shaft such that rotation of the wheel rotating shaft is secured with respect to the display bar rotating shaft.

The display casing may include a shaft support which is formed into a penetrating shape such that the display bar rotating shaft is inserted and fitted into the shaft support. The transparent display device using rotation-based persistence of vision may further include an outer bearing that is provided between the shaft support and the display bar rotating shaft in a state where the display bar rotating shaft is inserted into the shaft support such that rotation of the display bar rotating shaft is secured with respect to the shaft support.

The display bar driving unit may be positioned on one side of the display casing and may drive the display bar rotating shaft of the image display bar, and the wheel driving unit may be positioned on the other side of the display casing and may drive the rotary wheel.

The display casing may include shaft supports which are formed on both sides of the display casing and into which the display bar rotating shaft is inserted, the display bar rotating shaft being formed into a penetrating shape into which the wheel rotating shaft is inserted and fitted such that the wheel rotating shaft is inserted into the display bar rotating shaft, a first support member which is provided at a shaft support formed on one side of the display casing and supports the display bar rotating shaft at the shaft support such that the display bar rotating shaft is positioned at a center of the one shaft support, and a second support member which is provided at a shaft support formed on the other side of the display casing and supports the display bar rotating shaft at the shaft support such that the wheel rotating shaft is positioned at a center of the other shaft support.

The first support member may have a first power transmitting portion which transmits power of the display bar driving unit to rotate the display bar rotating shaft by rotating the first support member coupled to the display bar rotating shaft.

The second support member may have a second power transmitting portion which transmits power of the display bar driving unit to rotate the wheel rotating shaft by rotating the second support member coupled to the wheel rotating shaft.

According to another embodiment of the present invention, there is provided a transparent display device using rotation-based persistence of vision, the transparent display device including: an opaque display unit that includes a rotary wheel which displays first images and a wheel driving unit which drives the rotary wheel; a transparent display unit that includes image display bars, which are positioned outside the opaque display unit and on each of which a plurality of light emitting elements are mounted, and a display bar driving unit which rotates the image display bars, the transparent display unit displaying second images which are viewed to overlap the first images by persistence of vision based on rotation of the image display bars; a display casing that accommodates both the opaque and transparent display units in a state where the transparent display unit is positioned outside the opaque display unit, the display casing having a sight window through which the first images and the second images are viewed; a first support member which is provided on one side of the display casing and supports the wheel rotating shaft of the rotary wheel such that the rotary wheel is rotatable in the display casing; and a second support member which is provided on the other side of the display casing and supports the display bar rotating shaft of the image display bars such that the image display bars are rotatable in the display casing.

The wheel driving unit which rotates the rotary wheel may be positioned on the one side of the display casing, and the display bar driving unit which rotates the image display bar may be positioned on the other side of the display casing. The first support member may have a first power transmitting portion which rotates the rotary wheel by receiving power of the wheel driving unit and rotating the first support member. The second support member may have a second power transmitting portion which rotates the image display bars by receiving power of the display bar driving unit and rotating the second support member.

According to still another embodiment of the present invention, there is provided a transparent display device using rotation-based persistence of vision, the transparent display device including: an opaque display unit that includes a rotary wheel which displays first images and a wheel driving unit which drives the rotary wheel; a transparent display unit that includes image display bars, which are positioned outside the opaque display unit and on each of which a plurality of light emitting elements are mounted, and a display bar driving unit which rotates the image display bars, the transparent display unit displaying second images which are viewed to overlap the first images by persistence of vision based on rotation of the image display bars; image boards that provide, to the image display bars, image signals which are to be displayed on the image display bars, respectively, the image boards are provided at the respective image display bars, and dummy portions are included that are provided in an opposite direction of a direction in which the image boards are provided, around the display bar rotating shaft around which the image display bars rotate, the dummy portions inhibiting eccentricity from being generated due to weight of the respective image boards.

According to still another embodiment of the present invention, there is provided a game machine equipped with a transparent display device using rotation-based persistence of vision, the game machine including: a transparent display device according to the embodiment; a game-machine body on which the transparent display device is mounted; and a manipulation unit that is installed in the game-machine body and manipulates a game in accordance with the game displayed by the transparent display device using rotation-based persistence of vision.

Advantageous Effects of Invention

According to the present invention, image display bars which display images are arranged at regular angles, and thereby the eccentricity can be inhibited from being generated such that clear images can be displayed.

In addition, in a transparent display unit using persistence of vision, the image display bars and image boards which transmit image signals are provided to rotate together, and thus there is no need to provide an access structure for transmitting the image signals such that manufacturing costs can be reduced and a high-definition image can be easily displayed.

In addition, since a dummy portion is formed at an opposite location of a location at which a board mounting portion is not provided, display of an ununiform image due to the generation of eccentricity can be minimized. Further, since the first support member and the second support member stably support a rotary wheel and the image display bars, the generation of oscillation is minimized, and thereby an image can be provided using clear persistence of vision.

In addition, since a first image displayed by a transparent display unit which displays an image using persistence of vision can be viewed to overlap a second image displayed by an opaque display unit, a visual effect can be improved.

In addition, since a wheel driving unit which drives a rotary wheel is positioned on one side of a display casing, and a display bar driving unit which drives the image display bars is positioned on the other side of the display casing, not

REFERENCE SIGNS LIST

100: Transparent Display Device
110: Transparent Display Unit
111: Image Display Bar
111a: Light Emitting Element
113: Display Bar Rotating Shaft
113a: Shaft Hole
115: Display Bar Connecting Member
117a: Board Mounting Portion
117b: Dummy Portion
119: Image Board
120: Opaque Display Unit
121: Rotary Wheel
123: Wheel Rotating Shaft
130: Display Casing
131: Shaft Support
131a: Support Hole
131b: Penetrating Groove
133: Sight Window
135: Protective Cover
140: Display Bar Driving Unit
141, 151: Drive Motor
143, 153: Drive Wheel
150: Wheel Driving Unit
161: Inner Bearing
163: Outer Bearing
170: First Support Member
171: Shaft Insertion Portion
173: First Power Transmitting Portion
180: Second Support Member
181: Shaft Coupling Portion
183: Second Power Transmitting Portion
200 Game-Machine Body
210: Manipulation Unit
300: Game Machine
FI: First Image
SI: Second Image

PREFERRED EMBODIMENTS FOR CARRYING OUT THE INVENTION

Hereinafter, embodiments of the present invention will be described with reference to the accompanying drawings.

As illustrated in FIGS. 1 to 6, a transparent display device 100 using rotation-based persistence of vision according to a first embodiment of the present invention can include an opaque display unit 120.

The opaque display unit 120 can display first images FI.

The opaque display unit 120 can include a rotary wheel 121 and a wheel driving unit 150.

The rotary wheel 121 can be formed into a cylindrical shape and can have a plurality of first images FI having shapes different from each other which are formed on an outer surface of the rotary wheel 121 in a circumferential direction to provide a viewer with the plurality of different first images FI depending on a rotation angle.

A plurality of rotary wheels 121 can be provided along a wheel rotating shaft 123 of the rotary wheels 121, the plurality of rotary wheels 121 coupled to the wheel rotating shaft 123 can be configured to independently be rotated and stopped.

Further, the rotary wheels 121 can rotate around the wheel rotating shaft 123 of the rotary wheels 121, and the wheel rotating shaft 123 can project from both sides of the rotary wheels 121.

The wheel driving unit 150 can selectively provide a viewer with the plurality of first images FI formed on the rotary wheels 121, and the wheel driving unit 150 can selectively provide a viewer the first images FI by stopping rotation of the rotary wheels 121 at a sightline of the viewer.

The first images FI can be printed as a preset pattern around the rotary wheel 121 or can be formed on the rotary wheels 121 in a form of being attached thereto.

The wheel driving unit 150 can be configured to include a drive wheel 153 and a drive motor 151 which rotates the drive wheel 153 with electricity, and the wheel driving unit 150 can rotate the rotary wheels 121 in a state where the drive wheel 153 rotates the wheel rotating shaft 123 when the drive wheel 153 is rotated by the drive motor 151.

The drive wheel 153 can be realized by a friction wheel or a gear.

As illustrated in FIGS. 1 to 6, the transparent display device 100 using rotation-based persistence of vision according to the first embodiment of the present invention can include a transparent display unit 110.

The transparent display unit 110 can display a second image SI using persistence of vision based on rotation.

The transparent display unit 110 can be positioned outside the opaque display unit 120 and can display the second image SI.

The transparent display unit 110 can include an image display bar 111 and a display bar driving unit 140.

The image display bar 111 can be configured to have a plurality of light emitting elements 111a arranged in a length direction of the image display bar 111.

The image display bar 111 can display the second image SI using the persistence of vision by instantaneously causing the light emitting elements 111a to emit light at a correct timing at a location at which the second image SI is to be displayed, on the basis of a unit of vertical or horizontal line of the entire second image SI which is to be displayed depending on rotation.

A predetermined mounting space can be formed by rotation of the image display bars 111 such that the opaque display unit 120 can be provided within a rotation radius of the image display bars 111.

The predetermined mounting space can be formed by rotating the image display bars 111 in a state where the image display bars 111 are arranged to be separated from display bar rotating shafts 113 as a rotating shaft of the image display bars 111, and the image display bars 111 and the display bar rotating shafts 113 are connected by display bar connecting members 115 such that the image display bars 111 are separated from the display bar rotating shafts 113.

The display bar rotating shafts 113 are positioned on both sides of the image display bar 111, and the display bar connecting member 115 can be connected to the display bar rotating shafts 113 positioned at the respective ends from both ends of the image display bar 111.

The plurality of image display bars 111 can be arranged around the display bar rotating shafts 113 at regular angles so as to inhibit the generation of eccentricity due to a biased weight during rotation of the image display bars.

In a case of the plurality of image display bars 111, the number of display bar connecting members 115 corresponds to the number of image display bars 111, and the display bar connecting members 115 are connected to the display bar rotating shafts 113 such that the image display bars 111 can be connected to be separated from the display bar rotating shafts 113.

It is needless to say that the plurality of image display bars 111 can be configured to be connected not by the divided display bar connecting members 115 but by a single display bar connecting member 115.

For example, the display bar connecting member 115 can be formed into a disk shape or a fan shape such that the plurality of display bar connecting members 115 can be configured to be connected to the display bar rotating shafts 113.

In the embodiment, two image display bars 111 are illustrated to be provided at both sides around a rotating shaft; however, two or more image display bars 111 can be provided.

The display bar rotating shafts 113 of the image display bars 111 and the wheel rotating shaft 123 of the rotary wheels 121 are positioned on the same axial line, and the image display bars 111 and the rotary wheels 121 can rotate around the same axial line.

When the image display bars 111 and the rotary wheels 121 are configured to rotate around the same axial line, the rotary wheels 121 located in the transparent display unit 110 can have a maximum size to improve a display effect of the first images FI.

The display bar rotating shaft 113 can have a shaft hole 113a. The wheel rotating shaft 123 of the opaque display device 120 positioned within the rotation radius of the image display bar 111 can penetrate to be fitted into the shaft hole 113a.

Further, an inner bearing 161 can be provided between the display bar rotating shaft 113 and the wheel rotating shaft 123 to secure independent rotation of the rotating shafts.

The wheel rotating shaft 123 which penetrates the shaft hole 113a is fitted into an inner ring of the inner bearing 161, an outer ring of the inner bearing 161 is supported by the shaft hole 113a of the display bar rotating shaft 113, and thus the inner bearing 161 can secure the independent rotation of the wheel rotating shaft.

The inner bearing 161 can be provided for each of the display bar rotating shafts 113 positioned at both sides of the image display bars 111.

Similarly to the wheel driving unit 150, the display bar driving unit 140 can be configured to include a drive wheel 143 and a drive motor 141, and the display bar driving unit 140 can rotate the image display bars 111 in a state where the drive wheel 143 rotates the display bar rotating shaft 113 when the drive wheel 143 is rotated by the drive motor 141.

As illustrated in FIGS. 1 to 6, the transparent display device 100 using rotation-based persistence of vision according to the first embodiment of the present invention can include a display casing 130.

The display casing 130 can protect the transparent display unit 110 and the opaque display unit 120.

The display casing 130 has a sight window 133 through which the inside is viewed at a preset region at which the first images FI displayed by the opaque display unit 120 and the second images SI displayed by the transparent display unit 110 are viewed to overlap each other.

Further, a protective cover 135 which is made of a transparent material can be provided at the sight window 133 to protect the transparent display unit 110 and the opaque display unit 120.

The display casing 130 can be formed to have an inside having a radius larger than the rotation radius of the image display bars 111 such that the image display bars 111 of the transparent display unit 110 can be rotated.

The display casing 130 can have shaft supports 131 which project at both sides thereof to support the transparent display unit 110 and the opaque display unit 120 in the display casing 130.

The shaft support 131 has a support hole 131a formed to penetrate the shaft support and communicate with the inside such that the display bar rotating shaft 113 of the image display bars 111 is fitted into the support hole.

Further, an outer bearing 163 is inserted between the display bar rotating shaft 113 inserted into the support hole 131a and the shaft support 131 of the display casing 130, and thus the rotation of the image display bars 111 can be secured in a state where the display casing 130 is stopped.

For example, the display bar rotating shaft 113 is inserted into an inner ring of the outer bearing 163, an outer ring of the outer bearing 163 is supported by an inner circumference of the support hole 131a of the shaft support 131, and thus the display bar rotating shaft 113 of the image display bars can be supported to be easily rotated in the display casing 130.

Figure 1:
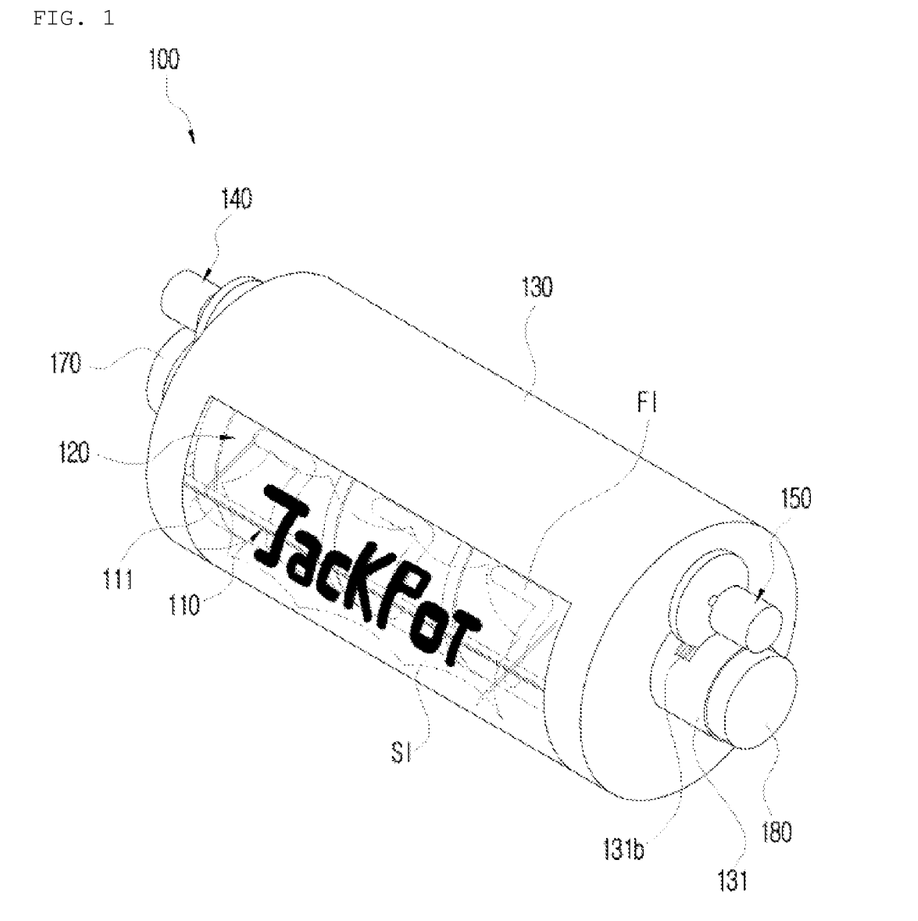
FIG. 1 is a perspective view illustrating a transparent display device using rotation-based persistence of vision according to a first embodiment of the present invention.
Figure 2:
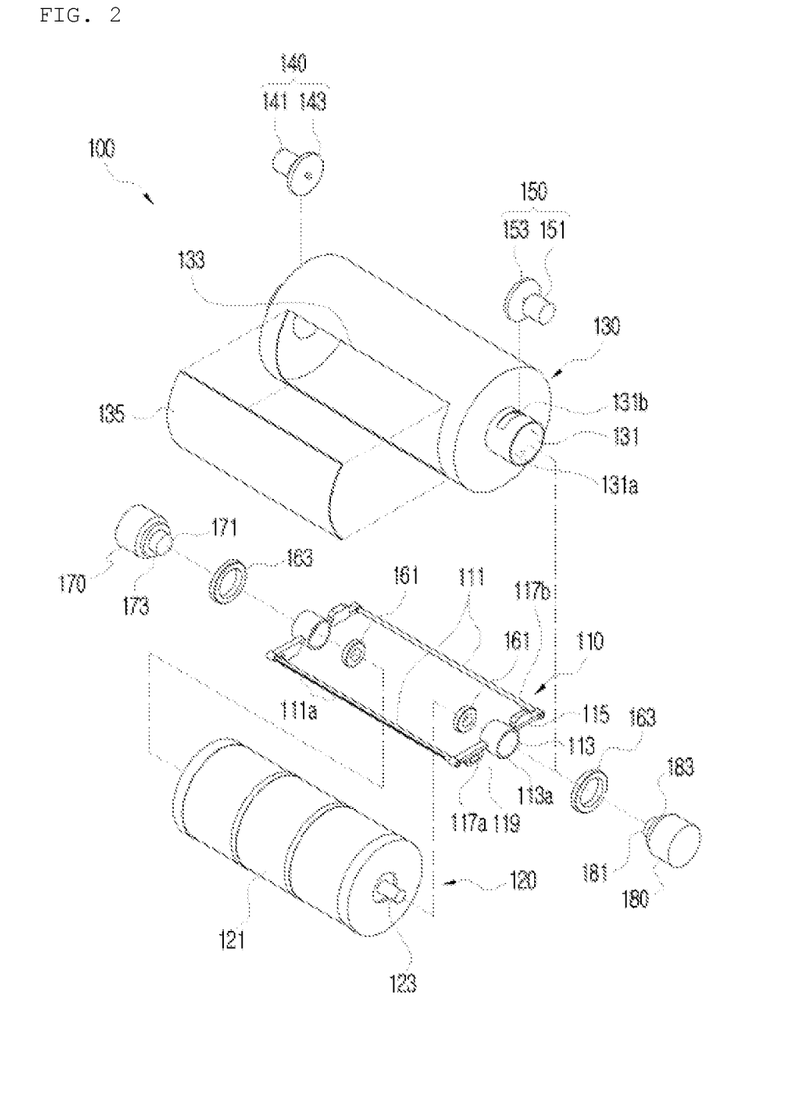
FIG. 2 is an exploded perspective view illustrating the transparent display device using rotation-based persistence of vision according to the first embodiment of the present invention.
Figure 3:
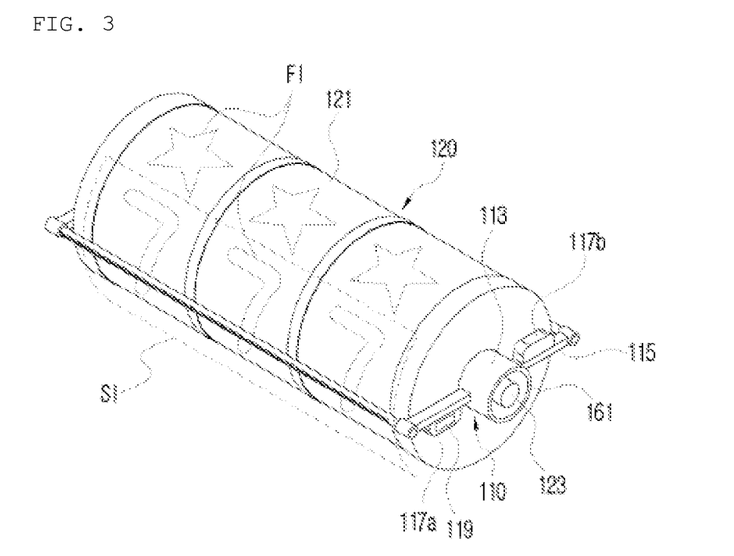
FIG. 3 is a perspective view illustrating a state where a rotary wheel and image display bars of the transparent display device using rotation-based persistence of vision according to the first embodiment of the present invention are coupled to each other.
Figure 4:
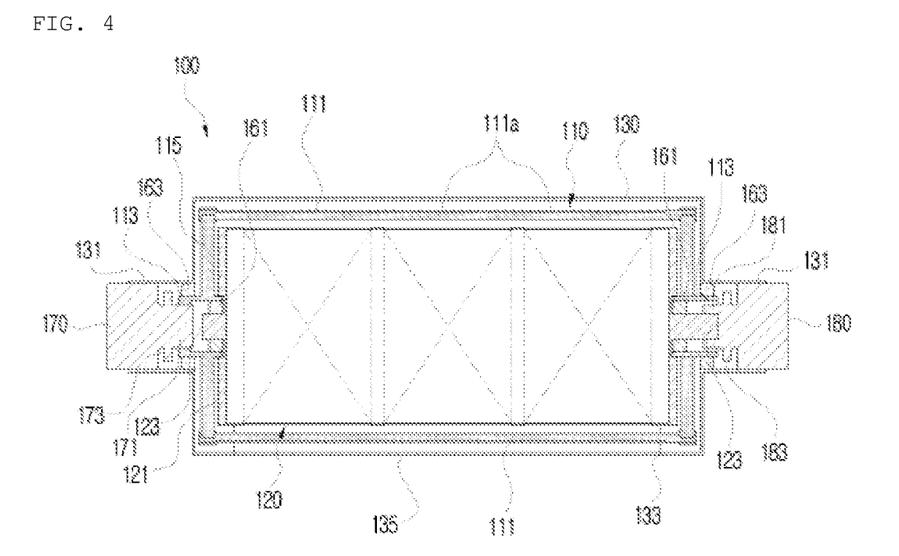
FIG. 4 is a sectional view obtained when viewing, from above, the transparent display device using rotation-based persistence of vision according to the first embodiment of the present invention.
Figure 5:
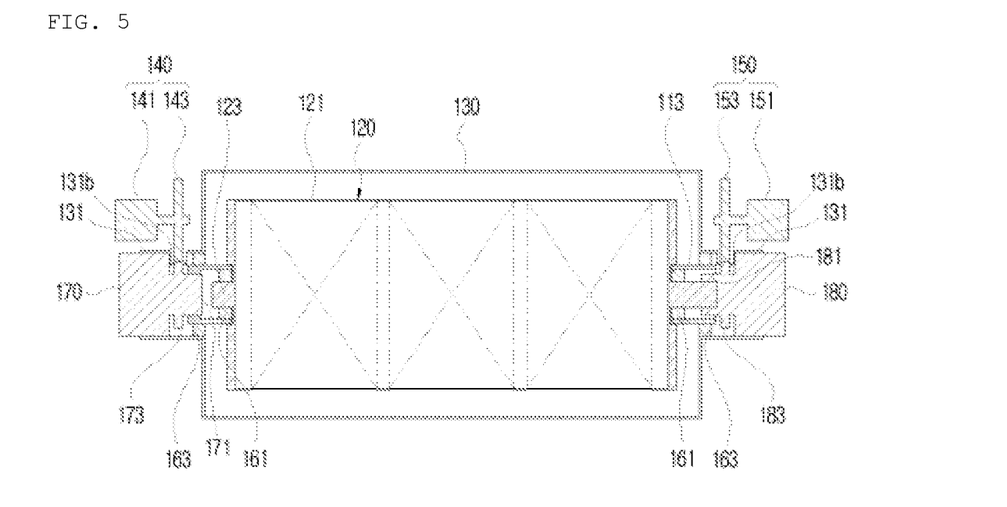
FIG. 5 is a sectional view obtained when viewing, from front, the transparent display device using rotation-based persistence of vision according to the first embodiment of the present invention.
Figure 6:
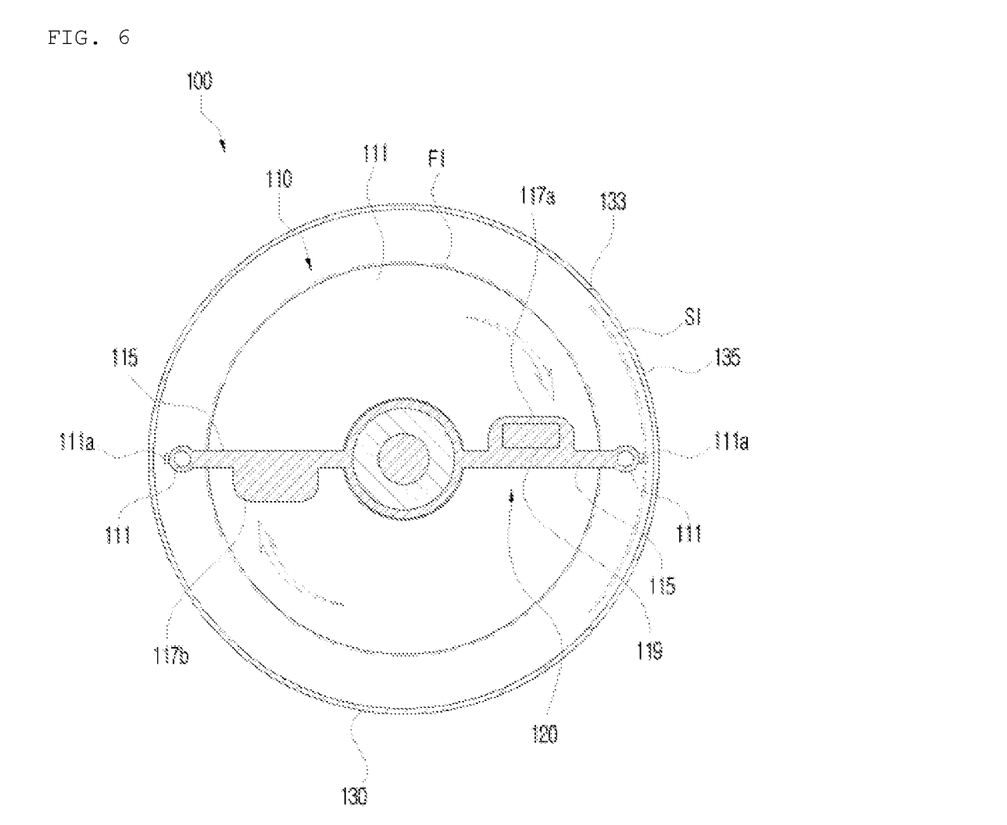
FIG. 6 is a sectional view obtained when viewing, from side, the transparent display device using rotation-based persistence of vision according to the first embodiment of the present invention.

As illustrated in FIGS. 2, 4, and 5, the transparent display device 100 using rotation-based persistence of vision according to the first embodiment of the present invention can include a first support member 170 and a second support member 180.

The first support member 170 and the second support member 180 stably support the rotary wheels 121 and the image display bars 111 in the display casing 130, respectively, such that generation of oscillation is minimized, and thereby an image can be inhibited from being ununiformly displayed by the persistence of vision due to the generation of oscillation during an operation.

The first support member 170 is provided at the shaft support 131 positioned on one side of the display casing 130 such that the display bar rotating shafts 113 of the image display bars 111 can be supported by the shaft support 131 to be positioned at the center of the shaft support 131.

The first support member 170 can be provided to be rotatably inserted into the shaft support 131 and can have a shaft insertion portion 171, which is inserted into the display bar rotating shaft 113, at a part of the first support member 170 which is inserted into an inside of the shaft support 131 such that the first support member 170 can be fitted to be fixed to the display bar rotating shaft 113.

A first power transmitting portion 173 can be formed between the first support member 170 and the shaft insertion portion 171, and the first power transmitting portion 173 can be realized by a friction wheel or a gear.

The display bar driving unit 140 can be positioned at a part of the shaft support 131 at which the first support member 170 is provided, and the drive wheel 143 of the display bar driving unit 140 and the first power transmitting portion 173 penetrate the shaft support 131 and come into contact with each other, and thereby the image display bars 111 can be rotated in a state where the first support member 170 is rotated with power of the display bar driving unit 140.

The shaft support 131 can have a penetration groove 131b which the drive wheel 143 of the display bar driving unit 140 penetrates to come into contact with the first power transmitting portion 173.

The second support member 180 is provided at the shaft support 131 positioned on the other side of the display casing 130 such that the wheel rotating shafts 123 of the rotary wheels 121 can be supported by the shaft support 131 to be positioned at the center of the shaft support 131.

The second support member 180 can be provided to be rotatably inserted into the shaft support 131 and can have a shaft coupling portion 181, which is inserted into the wheel rotating shaft 123, at a part of the second support member 180 which is inserted into an inside of the shaft support 131 such that the wheel rotating shaft 123 is fitted into the shaft coupling portion and the second support member 180 can support the wheel rotating shaft 123.

The shaft coupling portion 181 can have a shaft coupling groove into which the wheel rotating shaft 123 can be fitted and fixed.

A second power transmitting portion 183 can be formed between the second support member 180 and the shaft coupling portion 181, and the second power transmitting portion 183 can be realized by a friction wheel or a gear.

The wheel driving unit 150 can be positioned at a part of the shaft support 131 at which the second support member 180 is provided, and the drive wheel 153 of the wheel driving unit 150 and the second power transmitting portion 183 penetrate the shaft support 131 and come into contact with each other, and thereby the image display bars 111 can be rotated in a state where the second support member 180 is rotated with power of the wheel driving unit 150.

The shaft support 131 can have a penetration groove 131b which the drive wheel 153 of the wheel driving unit 150 penetrates to come into contact with the second power transmitting portion 183.

Figure 7:
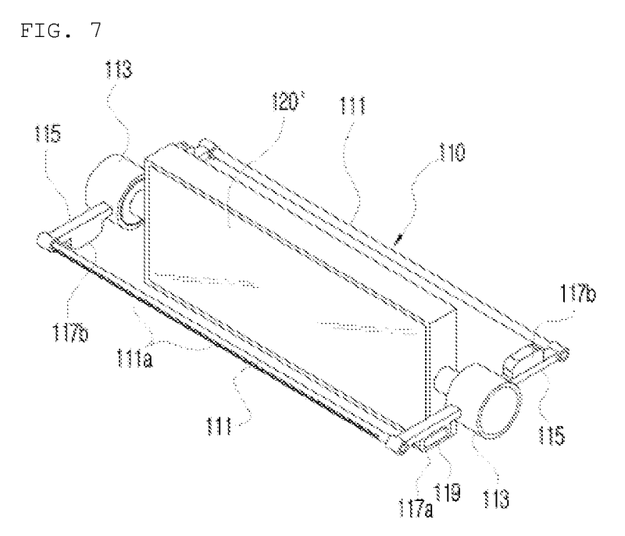
FIG. 7 is a perspective view illustrating a transparent display device using rotation-based persistence of vision according to a second embodiment of the present invention to which an opaque display unit of a modification example is applied.

As illustrated in FIG. 7, a transparent display device 100 using rotation-based persistence of vision according to a second embodiment of the present invention is characterized by an opaque display unit 120'.

The opaque display unit 120' of the second embodiment can be realized by a display panel which electronically displays the first images FI, and the display panel can be realized by various types of known display panels such as OLED, LCD, PDP, LCOS, or E-ink.

Here, the first image FI can be a still image or a video, and the first image FI can be displayed in a state where the first image FI formed on the rotary wheel 121 in the first embodiment is rotated and then stopped.

It is needless to say that the opaque display unit 120' of the second embodiment is provided not in a rotating state but in a stopped state.

For example, when the opaque display unit 120' is realized by the display panel, only the display bar rotating shafts 113 are connected to the wheel driving unit 150, and the opaque display unit 120' may not form a rotating shaft which is connected to the wheel driving unit 150.

Figure 8:
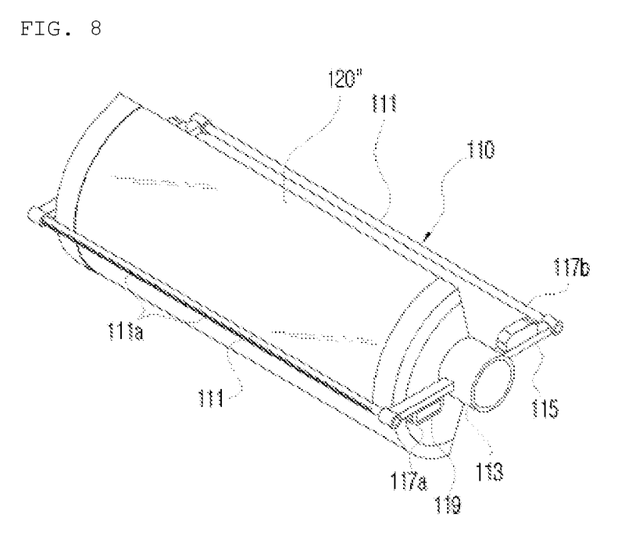
FIG. 8 is a perspective view illustrating a transparent display device using rotation-based persistence of vision according to a third embodiment of the present invention to which a convex opaque display unit is applied.
Figure 9:
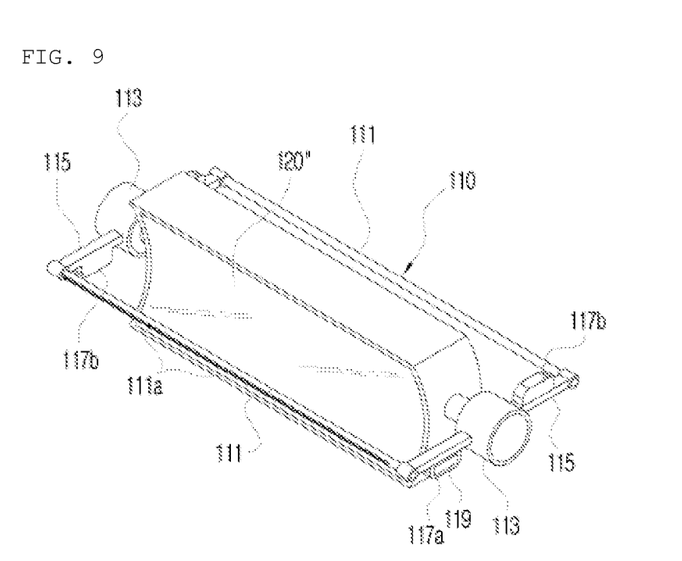
FIG. 9 is a perspective view illustrating the transparent display device using rotation-based persistence of vision according to the third embodiment of the present invention to which a concave opaque display unit is applied.

As illustrated in FIGS. 8 and 9, a transparent display device 100 using rotation-based persistence of vision according to a third embodiment of the present invention is characterized by an opaque display unit 120".

The opaque display unit 120" of the third embodiment can be realized by a display panel which electronically displays the first images FI, and the display panel can be configured to have a convex surface with a curved shape similar to the rotary wheel 121 of the first embodiment or can be configured to have a concave surface with a curved shape.

Here, the first image FI can be a still image or a video, and the first image FI can be displayed in a state where the first image FI formed on the rotary wheel 121 in the first embodiment is rotated and then stopped.

When the display panel is curved into the curved shape and displays the first image FI, a visual effect similar to an effect obtained by rotating the rotary wheel 121 and displaying the first image FI can be obtained.

Operations and effects between configurations described above are described.

The transparent display device 100 using rotation-based persistence of vision according to the embodiments of the present invention is inserted into the display casing 130 in a state where the opaque display unit 120 is positioned inside the transparent display unit 110.

Meanwhile, in the transparent display unit 110, the plurality of image display bars 111, on each of which a plurality of light emitting elements 111a are mounted, are arranged around the display bar rotating shafts 113, the image display bars 111 are all connected to the display bar rotating shaft 113 by the display bar connecting member 115.

Since the image display bars 111 are arranged around the display bar rotating shaft 113 at regular angles, ununiform rotation due to the generation of eccentricity during rotation can be inhibited.

Meanwhile, the display bar connecting member 115 has an image board 119 which provides a video signal that is to be displayed on the image display bar 111, and the image board 119 is provided at a board mounting portion 117a formed to extend from the display bar connecting member 115. The display bar connecting member 115 positioned opposite the display bar connecting member 115 at which the image board 119 is provided, with the display bar rotating shaft 113 as the center, has a dummy portion 117b formed to have the same size and weight so as to inhibit the eccentricity due to the installation of the board mounting portion and the image board.

Another example can have a configuration in which the image board 119 is not provided in the transparent display device 100, but can be connected from outside by an electric wire, and the rotating image display bars 111 and the image board 119 positioned outside transmit a video signal through a slip ring which transmits an electrical signal to the display bar rotating shaft 113 of the image display bars 111.

Still another example can have a configuration in which the image display bar 111 has a signal receiving unit that wirelessly receives a video signal, the image board 119 has a signal transmitting unit that wirelessly sends a video signal, and the video signal is wirelessly transmitted from the image board 119 to the image display bar 111.

Further, the opaque display unit 120 is disposed in the predetermined mounting space formed by the rotating image display bars 111, and the opaque display unit 120 is coupled by inserting and fitting the rotary wheel 121 into the display bar rotating shafts 113 such that the wheel rotating shaft 123 of the rotary wheels 121 is positioned on the same axial line with the display bar rotating shaft 113.

The inner bearing 161 is provided between the display bar rotating shaft 113 and the wheel rotating shaft 123 to inhibit mutual interference due to individual rotation of the rotary wheels 121 and the image display bars 111.

In a state where the image display bars 111 and the rotary wheels 121 are coupled to each other, the opaque display unit 120 and the transparent display unit 110 are inserted into the display casing 130.

The image display bars 111 and the rotary wheels 121 are coupled to each other in the display casing 130 by inserting and fitting the display bar rotating shafts 113 of the image display bars 111 into the shaft supports 131 formed in the display casing 130, and the outer bearing 163 is provided to be inserted between the shaft support 131 and the display bar rotating shaft 113 so as to secure independent rotation of the image display bars 111 in the display casing 130.

Further, the first support member 170 which is provided to support and rotate the display bar rotating shaft 113 is inserted into the shaft support 131 positioned on one side of the display casing 130, and the second support member 180 which is provided to support and rotate the wheel rotating shaft 123 is inserted into the shaft support 131 positioned on the other side of the display casing 130.

Here, the first support member 170 has the shaft insertion portion 171 formed to be inserted and fitted into the display bar rotating shaft 113, and thus the shaft support 131 supports the display bar rotating shaft 113 in a state where the shaft insertion portion 171 is fitted in and fixed to the display bar rotating shaft 113. Hence, the first support member 170 fitted into the shaft support 131 is coupled thereto in a state of being rotatable in the shaft support 131.

Further, the first power transmitting portion 173 which receives power from the display bar driving unit 140 is provided between the first support member 170 and the shaft insertion portion 171, a penetration groove 131b which penetrates the shaft support 131 is formed at a part of the shaft support 131 at which the first power transmitting portion 173 is positioned, and the display bar driving unit 140 is provided above the shaft support 131 into which the first support member 170 is inserted.

In the display bar driving unit 140, the drive wheel 143 is provided to penetrate the penetration groove 131b and come into contact with the first power transmitting portion 173, and the drive wheel 143 is provided to be rotated by the drive motor 141.

The second support member 180 has the shaft coupling portion 181, and the wheel rotating shaft 123 is coupled to the shaft coupling portion 181 by being inserted into the shaft coupling portion 181 at the shaft support 131 such that the shaft support 131 supports the wheel rotating shaft 123. The second power transmitting portion 183 is formed between the second support member 180 and the shaft coupling portion 181, the penetration groove 131b which penetrates the shaft support 131 is formed at a part of the shaft support 131 at which the second power transmitting portion 183 is positioned, and the wheel driving unit 150 is provided above the shaft support 131 into which the second support member 180 is inserted.

The wheel driving unit 150 includes the drive wheel 143 or 153 which is provided to penetrate the penetration groove 131b and come into contact with the second power transmitting portion 183, and the drive wheel 153 is provided to be rotated by the drive motor 151.

In the transparent display device 100 using rotation-based persistence of vision according to the embodiments of the present invention configured as described above, when the wheel driving unit 150 is operated, the drive wheel 153 which is rotated by the drive motor 151 rotates the second power transmitting portion 183 provided at the second support member 180, rotation of the second power transmitting portion 183 causes the wheel rotating shaft 123 coupled to the second power transmitting portion 183 to be rotated and results in rotation of the rotary wheels 121, and the first images FI are provided to a viewer by stopping any first image FI such that the first image FI is viewed through the sight window 133.

At the same time, when the display bar driving unit 140 is operated, the drive wheel 143 which is rotated by the drive motor 141 rotates the first power transmitting portion 173 provided at the first support member 170, and rotation of the first power transmitting portion 173 causes the display bar rotating shaft 113 to be rotated by the first power transmitting portion 173 and results in rotation of the image display bars 111 around the rotary wheels 121.

As the rotating image display bar 111 causes the light emitting elements 111a to emit light instantaneously at a correct timing by the image board 119 on the basis of a unit of line of the second image SI which is to be displayed at a part at which the sight window 133 is positioned, the second image SI is provided through the sight window 133 using the persistence of vision of the light emitting elements 111a, and thereby a viewer can view the first and second images SI in a state where the first images FI overlap the second image SI.

Here, when the transparent display unit 110 is not operated, the image display bars 111 are located at a location at which the image display bars are not viewed through the sight window 133 such that a field of view is inhibited from being blocked with the image display bars 111 positioned at the sight window 133, and the second image SI is prepared to be displayed.

In the transparent display device 100 using rotation-based persistence of vision according to the second and third embodiments, the first images FI are electronically displayed by the opaque display unit 120, and in addition, the image display bars 111 are rotated around the opaque display unit 120 and the image display bars 111 display the second image SI using the persistence of vision on the opaque display unit 120 such that the first images FI and the second image SI can be viewed to overlap each other.

Meanwhile, an image having a three-dimensional shape can be realized depending on a distance difference between the first images FI displayed by the image display bars 111 and the second image SI displayed by the opaque display unit 120.

For example, a three-dimensional video depending on a distance difference can be displayed through the first images FI displaying any subject and the second image SI displaying the background.

Hence, in the transparent display device 100 using rotation-based persistence of vision according to the embodiment of the present invention, the opaque display unit 120 displays the first images FI and the transparent display unit 110 displays the second image SI using the persistence of vision such that the first images FI and the second image SI are viewed to overlap each other. In this manner, a visual effect can not only be improved, but also the visual effect can be further improved when the transparent display unit 110 displays a video using the persistence of vision.

In addition, the plurality of image display bars 111 can be arranged at regular angles in a circumferential direction to inhibit the second image SI from being ununiformly displayed due to the generation of eccentricity. Further, the image board 119 which provides a video signal to the image display bar 111 is provided to rotate together with the image display bars 111 such that a high-definition image signal can be easily transmitted to and displayed by the rotating image display bar 111.

In addition, the image board 119 which transmits the image signal is provided together with the image display bar 111, and thus there is no need to provide an electrical access structure for transmitting the image signals such that not only the manufacturing costs can be reduced but also the occurrence of malfunction can be minimized.

In addition, the dummy portion 117b is formed to inhibit the eccentricity due to mounting of the image board 119 on the image display bar 111 such that an ununiform video due to the eccentricity is inhibited from being displayed.

In addition, with a relatively simple structure in which the wheel driving unit 150 that drives the rotary wheels 121 is positioned on one side and the display bar driving unit 140 that drives the image display bars 111 is positioned on the other side, the rotary wheels 121 and the image display bars 111 can be configured to simultaneously rotate.

In addition, the rotary wheels 121 and the image display bars 111 are rotated by the first support member 170 and the second support member 180 such that stable rotation is performed and oscillation is minimized. Hence, the ununiform display of the second image SI can be inhibited.

Figure 10:
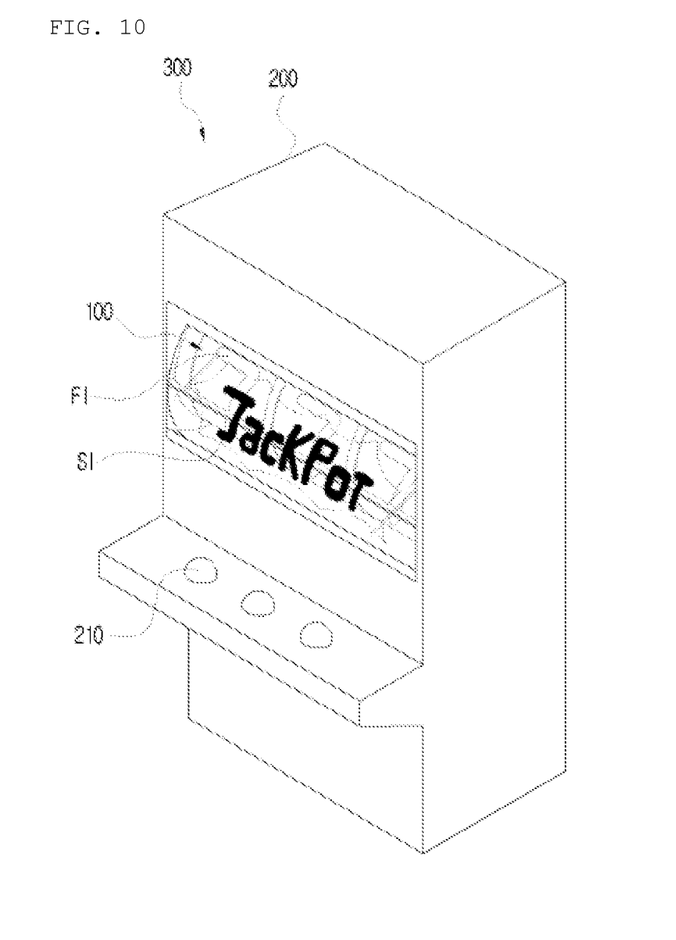
FIG. 10 is a perspective view illustrating a game machine equipped with a transparent display device using rotation-based persistence of vision according to another embodiment of the present invention.

Hereinafter, a game machine 300 equipped with a transparent display device 100 using rotation-based persistence of vision according to still another embodiment of the present invention can include the transparent display device 100, a game-machine body 200, and a manipulation unit 210.

As illustrated in FIG. 10, the game-machine body 200 can be provided inside the transparent display device 100 and can have a viewing window through which the first images FI and the second image SI viewed through the sight window 133 are viewed, the viewing window being formed at a part corresponding to the sight window 133 of the transparent display device 100.

Here, the first images FI which are provided by the opaque display unit 120 of the transparent display device 100 can be images for playing the game, and the second image SI which is provided by the transparent display unit 110 can be an image displayed based on the occurrence of an event during playing of the game.

The manipulation unit 210 can generate a manipulation signal indicating manipulation for playing a game in accordance with a game image displayed by the transparent display device 100.

The manipulation unit 210 can be realized into a shape of a button or a joystick.

In the game machine 300 equipped with the transparent display device 100 using rotation-based persistence of vision according to the embodiments of the present invention configured as described above, when the wheel driving unit 150 rotates the rotary wheels 121, a gamer generates the manipulation signal through the manipulation unit 210.

Further, when the manipulation signal is generated, the rotary wheels 121 are stopped, the first images FI are viewed through the sight window 133, and a gamer can play a game by obtaining a score depending on a combination of the first images FI which are randomly displayed when the plurality of rotary wheels 121 are stopped.

Meanwhile, when an event occurs during playing of a game, the display bar driving unit 140 rotates the image display bars 111, and the second image SI is displayed at the part of the image display bars 111 at which the sight window 133 is positioned depending on the persistence of vision of the light emitting elements 111a by causing the light emitting elements 111a to emit light on the basis of a unit of line of the second image SI which is to be displayed depending on a rotation timing.

Therefore, the transparent display device 100 using rotation-based persistence of vision according to the embodiments of the present invention can display the second image SI using the persistence of vision on the first images FI such that the visual effect of the game can be improved.

The scope of the patent right of the present invention is not limited to the embodiments and includes a scope of any modifications and changes which are accepted as equivalents by being easily modified from the embodiment of the present invention by a person with ordinary skill in the art to which the invention pertains.

The invention claimed is:

1. A transparent display device using rotation-based persistence of vision, comprising:
    an opaque display unit that displays first images;
    a transparent display unit that includes image display bars, which are positioned outside the opaque display unit and on each of which a plurality of light emitting elements are mounted, and a display bar driving unit which rotates the image display bars, the transparent display unit displaying second images which are viewed to overlap the first images by persistence of vision based on rotation of the image display bars; and
    a display casing that accommodates both the opaque and transparent display units in a state where the transparent display unit is positioned outside the opaque display unit, the display casing having a sight window through which the first images and the second images are viewed at a preset region,
    wherein the transparent display unit includes a plurality of image display bars which are arranged around a display bar rotating shaft at regular angles such that eccentricity is inhibited from being generated during rotation of the image display bars.

2. The transparent display device using rotation-based persistence of vision according to claim 1,
wherein the transparent display unit includes
display bar connecting members which connect all of the plurality of image display bars to be separated from the display bar rotating shaft in order to form a predetermined mounting space in which the opaque display unit is mounted as the image display bars rotate, and
image boards which are provided at the display bar connecting members to rotate together with the image display bars and provide image signals of the first images which are to be displayed on the image display bars.

3. The transparent display device using rotation-based persistence of vision according to claim 2,
wherein the display bar connecting members have respective board mounting portions which project from the display bar connecting members and at which the respective image boards are mounted, and
wherein each of the display bar connecting members has a dummy portion at a portion at which the board mounting portion is not formed, the dummy portion projecting to have a shape corresponding to the board mounting portion in order to inhibit eccentricity from being generated during rotation.

4. The transparent display device using rotation-based persistence of vision according to claim 1,
wherein the opaque display unit includes a display panel which electronically displays the first images.

5. The transparent display device using rotation-based persistence of vision according to claim 1,
wherein the opaque display unit includes
a rotary wheel which has a plurality of the first images formed into a pattern in a circumferential direction, and
a wheel driving unit which drives the rotary wheel.

6. The transparent display device using rotation-based persistence of vision according to claim 5,
wherein a wheel rotating shaft of the rotary wheel and the display bar rotating shaft of the image display bar are positioned on the same axial line.

7. The transparent display device using rotation-based persistence of vision according to claim 5,
wherein the display bar rotating shaft is formed into a penetrating shape such that the wheel rotating shaft of the rotary wheel is inserted and fitted into the display bar rotating shaft, and
wherein the transparent display device using rotation-based persistence of vision further comprises an inner bearing that is provided between the wheel rotating shaft and the display bar rotating shaft in a state where the wheel rotating shaft is inserted into the display bar rotating shaft such that rotation of the wheel rotating shaft is secured with respect to the display bar rotating shaft.

8. The transparent display device using rotation-based persistence of vision according to claim 5,
wherein the display casing includes a shaft support which is formed into a penetrating shape such that the display bar rotating shaft is inserted and fitted into the shaft support, and
wherein the transparent display device using rotation-based persistence of vision further comprises an outer bearing that is provided between the shaft support and the display bar rotating shaft in a state where the display bar rotating shaft is inserted into the shaft support such that rotation of the display bar rotating shaft is secured with respect to the shaft support.

9. The transparent display device using rotation-based persistence of vision according to claim 5,
wherein the display bar driving unit is positioned on one side of the display casing and drives the display bar rotating shaft of the image display bar, and the wheel driving unit is positioned on the other side of the display casing and drives the rotary wheel.

10. The transparent display device using rotation-based persistence of vision according to claim 5,
wherein the display casing includes
shaft supports which are formed on both sides of the display casing and into which the display bar rotating shaft is inserted, the display bar rotating shaft being formed into a penetrating shape into which the wheel rotating shaft is inserted and fitted such that the wheel rotating shaft is inserted into the display bar rotating shaft,
a first support member which is provided at a shaft support formed on one side of the display casing and supports the display bar rotating shaft at the shaft support such that the display bar rotating shaft is positioned at a center of the shaft support, and
a second support member which is provided at a shaft support formed on the other side of the display casing and supports the display bar rotating shaft at the shaft support such that the wheel rotating shaft is positioned at a center of the shaft support.

11. The transparent display device using rotation-based persistence of vision according to claim 10,
wherein the first support member has a first power transmitting portion which transmits power of the display bar driving unit to rotate the display bar rotating shaft by rotating the first support member coupled to the display bar rotating shaft.

12. The transparent display device using rotation-based persistence of vision according to claim 10,
wherein the second support member has a second power transmitting portion which transmits power of the display bar driving unit to rotate the wheel rotating shaft by rotating the second support member coupled to the wheel rotating shaft.

13. A transparent display device using rotation-based persistence of vision, comprising:
an opaque display unit that includes a rotary wheel which displays first images and a wheel driving unit which drives the rotary wheel;
a transparent display unit that includes image display bars, which are positioned outside the opaque display unit and on each of which a plurality of light emitting elements are mounted, and a display bar driving unit which rotates the image display bars, the transparent display unit displaying second images which are viewed to overlap the first images by persistence of vision based on rotation of the image display bars;
a display casing that accommodates both the opaque and transparent display units in a state where the transparent display unit is positioned outside the opaque display unit, the display casing having a sight window through which the first images and the second images are viewed;
a first support member which is provided on one side of the display casing and supports the wheel rotating shaft of the rotary wheel such that the rotary wheel is rotatable in the display casing; and a second support member which is provided on the other side of the display casing and supports the display bar rotating shaft of the image display bar such that the image display bar is rotatable in the display casing.

14. The transparent display device using rotation-based persistence of vision according to claim 13,
wherein the wheel driving unit which rotates the rotary wheel is positioned on a side of the display casing, and the display bar driving unit which rotates the image display bar is positioned on the other side of the display casing,
wherein the first support member has a first power transmitting portion which rotates the rotary wheel by receiving power of the wheel driving unit and rotating the first support member, and
wherein the second support member has a second power transmitting portion which rotates the image display bars by receiving power of the display bar driving unit and rotating the second support member.

15. A transparent display device using rotation-based persistence of vision, comprising:
an opaque display unit that includes a rotary wheel which displays first images and a wheel driving unit which drives the rotary wheel;
a transparent display unit that includes image display bars, which are positioned outside the opaque display unit and on each of which a plurality of light emitting elements are mounted, and a display bar driving unit which rotates the image display bars, the transparent display unit displaying second images which are viewed to overlap the first images by persistence of vision based on rotation of the image display bars;
image boards that provide, to the image display bars, image signals which are to be displayed on the image display bars, respectively;
wherein the image boards are provided at the respective image display bars, and
wherein dummy portions are included that are provided in an opposite direction of a direction, in which the image boards are provided, with respect to the display bar rotating shaft around which the image display bars rotate, the dummy portions inhibiting eccentricity from being generated due to weight of the respective image boards.

16. A game machine equipped with a transparent display device using rotation-based persistence of vision, the game machine comprising:
a transparent display device including an opaque display unit that displays first images, a transparent display unit that includes image display bars, which are positioned outside the opaque display unit and on each of which a plurality of light emitting elements are mounted, and a display bar driving unit which rotates the image display bars, the transparent display unit displaying second images which are viewed to overlap the first images by persistence of vision based on rotation of the image display bars, and a display casing that accommodates both the opaque and transparent display units in a state where the transparent display unit is positioned outside the opaque display unit, the display casing having a sight window through which the first images and the second images are viewed at a preset region, the transparent display unit including a plurality of image display bars which are arranged around a display bar rotating shaft at regular angles such that eccentricity is inhibited from being generated during rotation of the image display bars;
a game-machine body on which the transparent display device is mounted; and
a manipulation unit that is installed in the game-machine body and manipulates a game in accordance with the game displayed by the transparent display device using rotation-based persistence of vision.

\* \* \* \* \*